US012345954B2

(12) United States Patent
Legg

(10) Patent No.: US 12,345,954 B2
(45) Date of Patent: Jul. 1, 2025

(54) CUSTOMIZABLE ELECTRONIC EYEWEAR

(71) Applicant: Nebulae Inc., Chelmsford, MA (US)

(72) Inventor: Robert Dewayne Legg, Chelmsford, MA (US)

( * ) Notice: Subject to any disclaimer, the term of this patent is extended or adjusted under 35 U.S.C. 154(b) by 472 days.

(21) Appl. No.: 17/841,036

(22) Filed: Jun. 15, 2022

(65) Prior Publication Data
US 2023/0408849 A1 Dec. 21, 2023

(51) Int. Cl.
G02C 11/00 (2006.01)
G02C 5/22 (2006.01)
H01R 13/514 (2006.01)
H01R 33/94 (2006.01)

(52) U.S. Cl.
CPC ............... *G02C 11/10* (2013.01); *G02C 5/22* (2013.01); *H01R 13/514* (2013.01); *H01R 33/94* (2013.01); G02C 2200/08 (2013.01)

(58) Field of Classification Search
CPC ...... G02C 11/10; G02C 5/22; G02C 2200/08; G02C 2200/02; G02C 2200/06; G02C 5/146; H01R 13/514; H01R 33/94
See application file for complete search history.

(56) References Cited

U.S. PATENT DOCUMENTS 9,726,900 B1 8/2017 Holzer et al.
11,586,057 B2 * 2/2023 Blum .................... H01R 35/04
2010/0296045 A1 11/2010 Agnoli et al.
2013/0201439 A1 * 8/2013 Kokonaski ............. G02C 7/083
351/158
2019/0235272 A1 * 8/2019 Otra ....................... G02C 5/006
2019/0265508 A1 8/2019 Castañeda et al.
2020/0271953 A1 8/2020 Lin et al.
2022/0155617 A1 5/2022 Morrow

FOREIGN PATENT DOCUMENTS

WO 2022/007357 A1 1/2022

OTHER PUBLICATIONS

International Search Report and Written Opinion issued in corresponding International Application No. PCT/US23/25463, mailed Oct. 13, 2023, 8 pages.

* cited by examiner

*Primary Examiner* — Mustak Choudhury
(74) *Attorney, Agent, or Firm* — Verrill Dana, LLP; Robert L. Hover

(57) ABSTRACT

Customizable electronic eyewear is provided including a frame having left and right attachment ports, a first sensor module having a first frame engagement portion attachable to a left side of the frame at the left attachment port, a first temple hingedly attachable to the first sensor module opposite the frame, a second sensor module having a second frame engagement portion attachable to a right side of the frame at the right attachment port, a second temple hingedly attachable to the second sensor module opposite the frame, and a battery installable in a cavity defined in at least one of the first temple or the second temple and operable to supply electrical power to at least one of the first sensor module or the second sensor module.

18 Claims, 16 Drawing Sheets

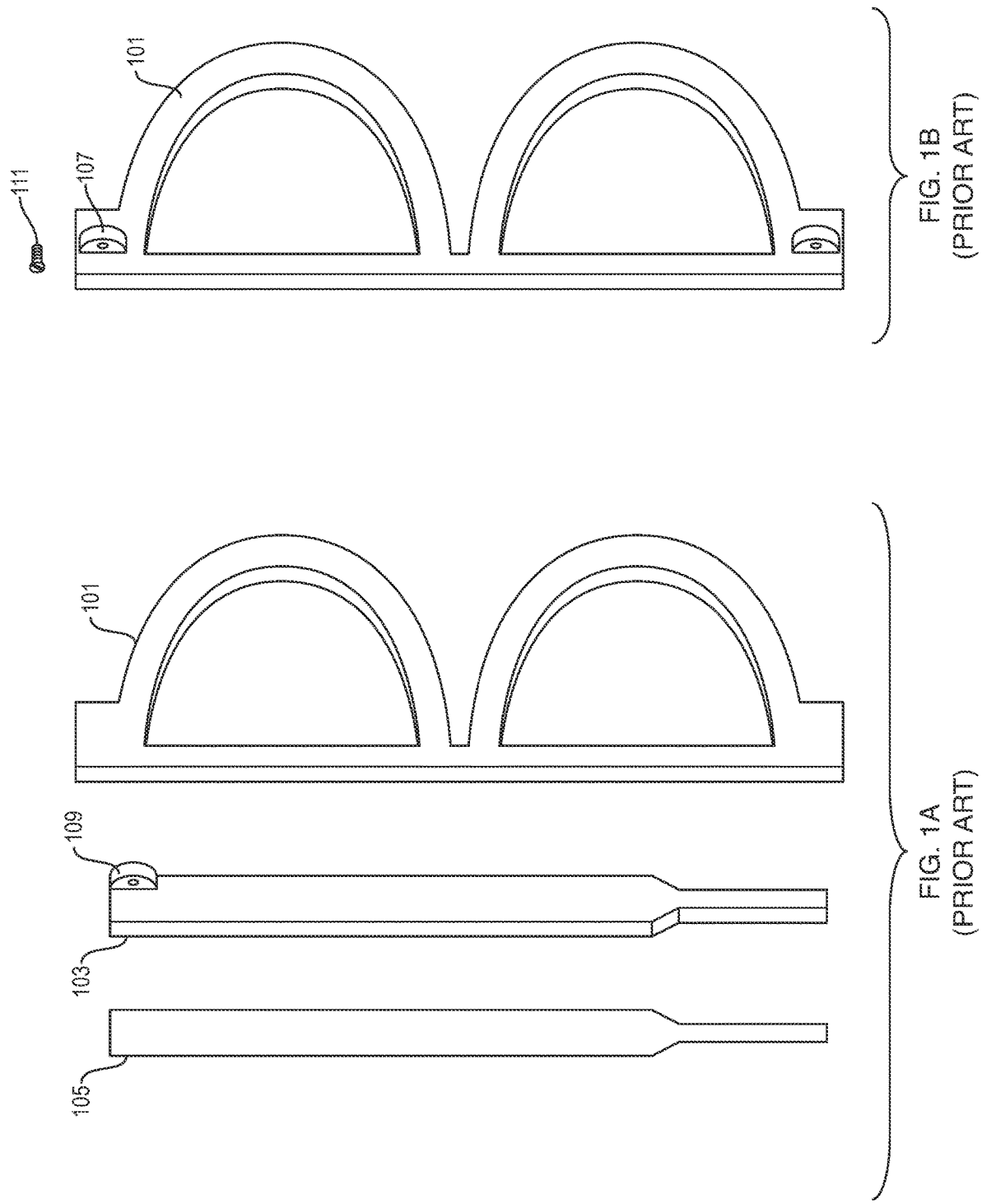

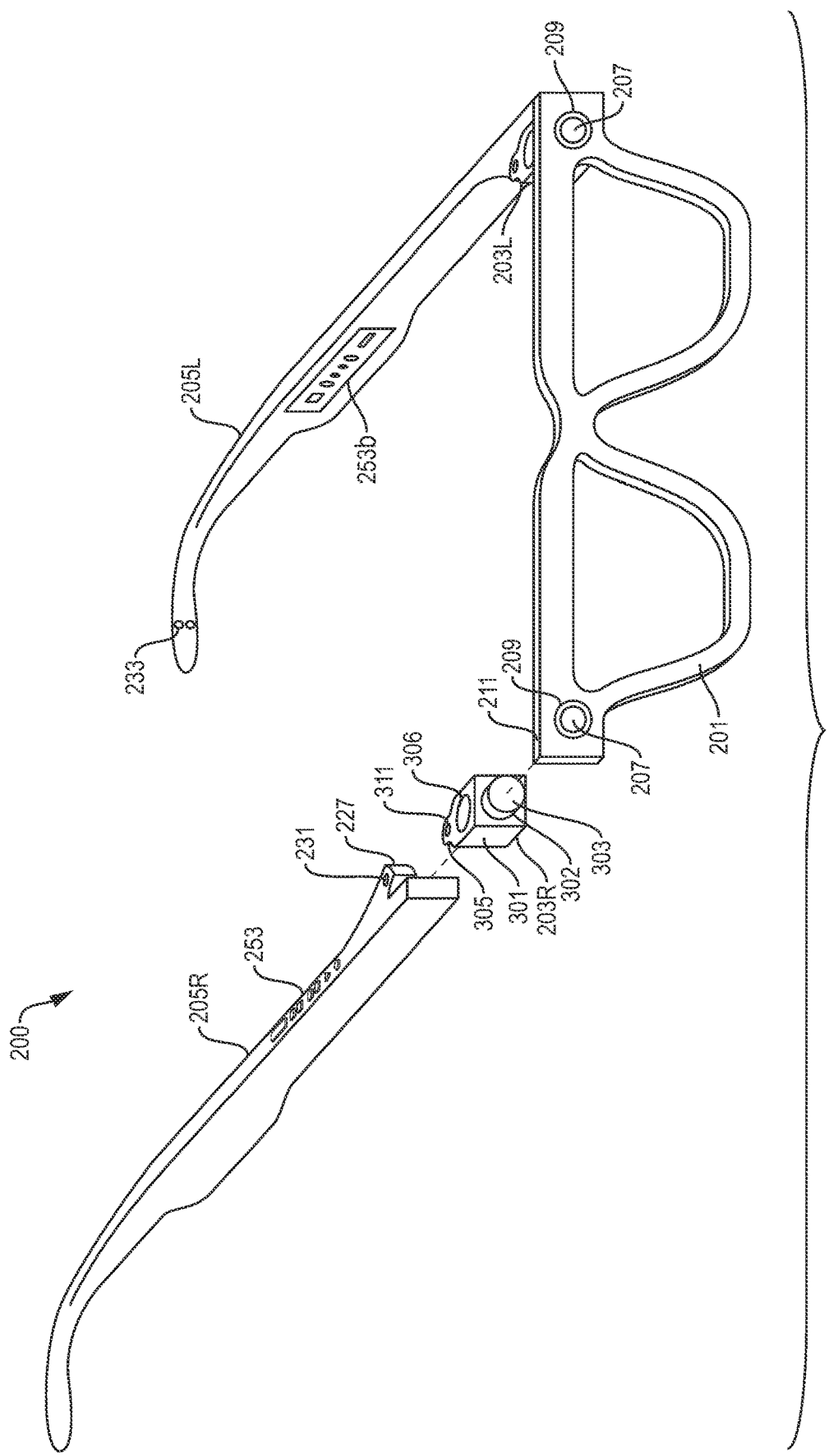

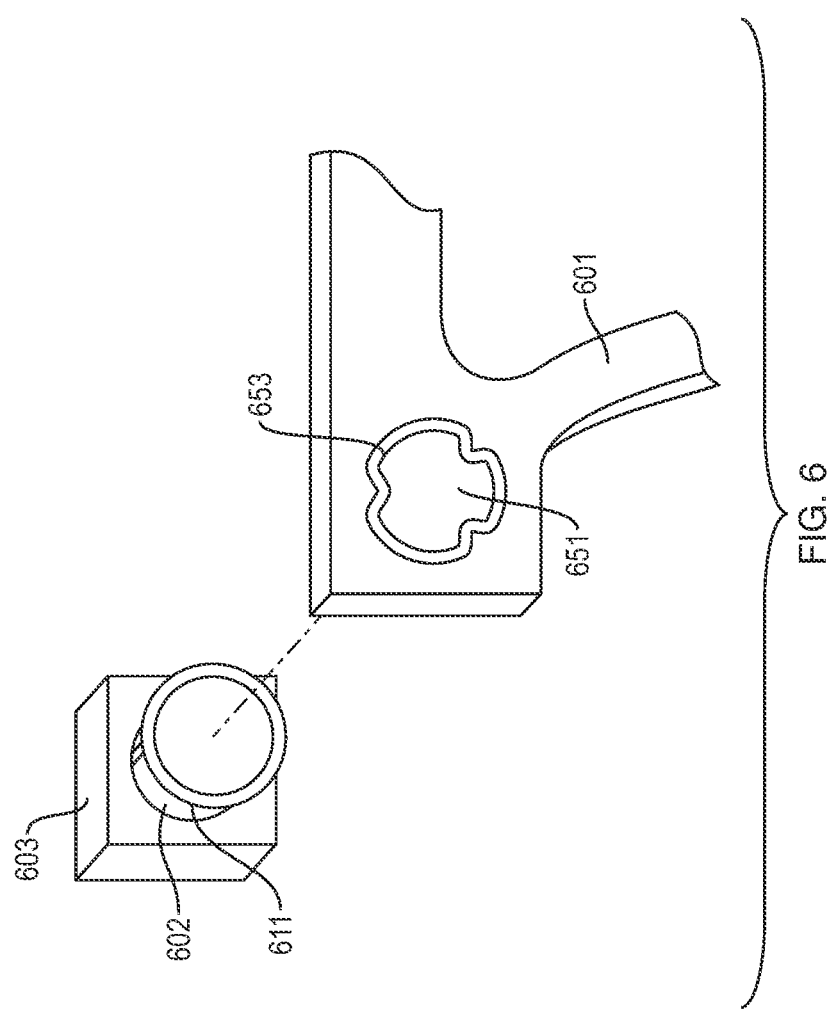

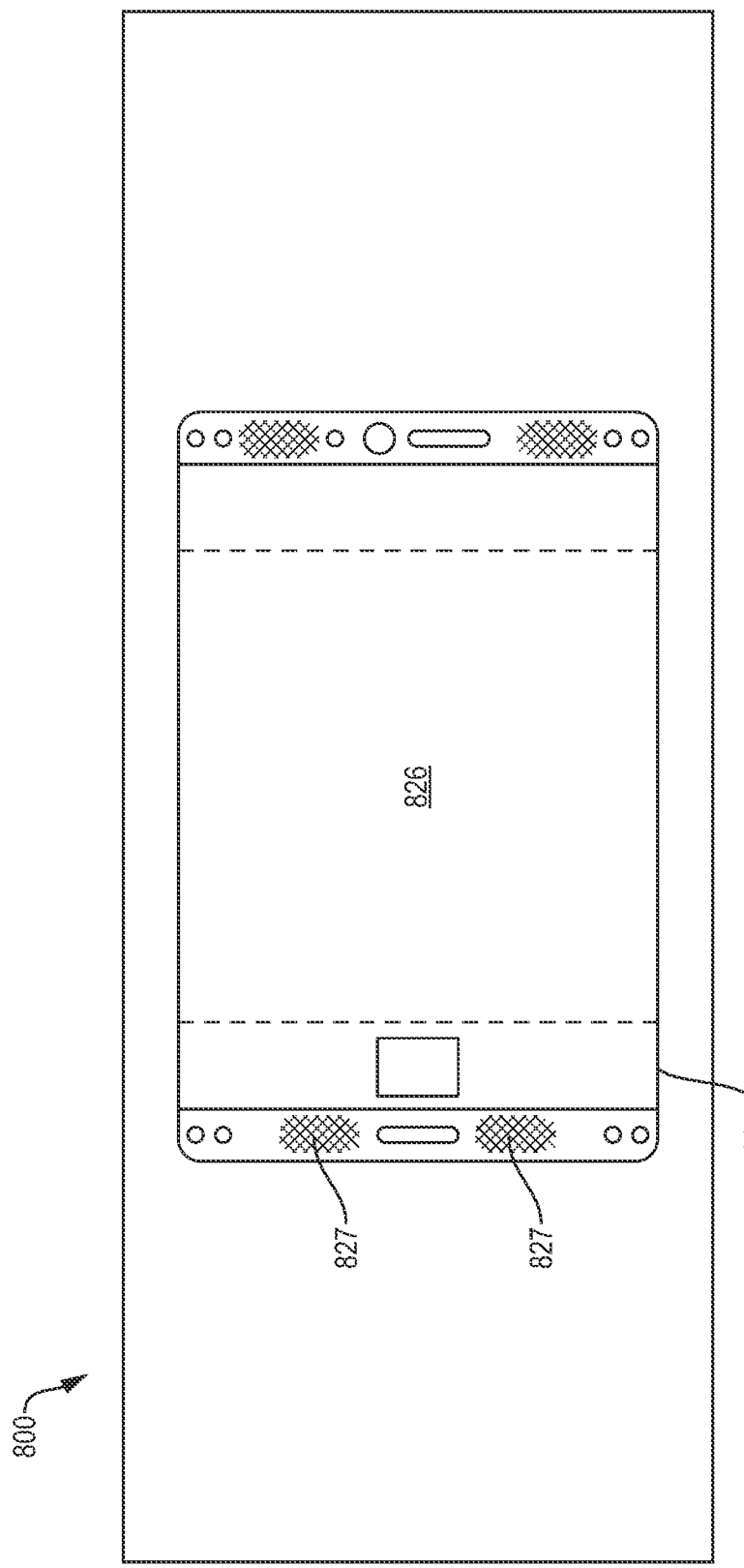

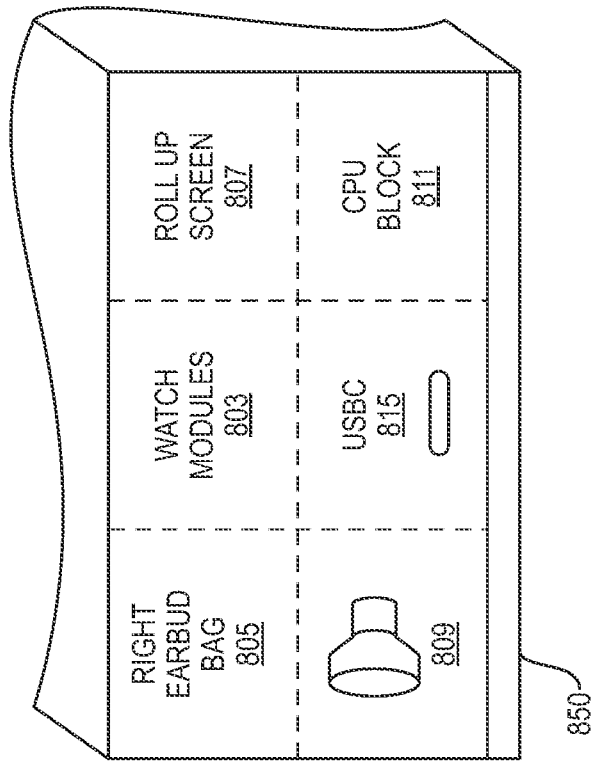
FIG. 8F
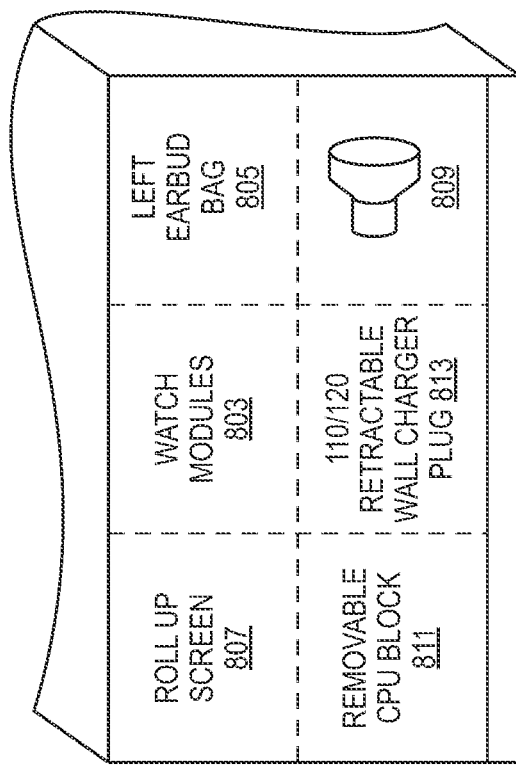
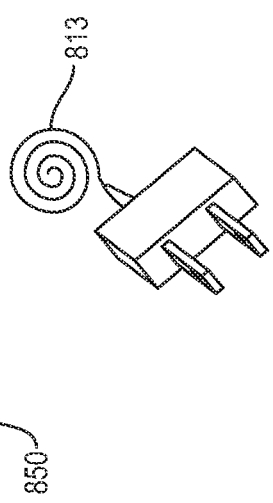
FIG. 8E

CUSTOMIZABLE ELECTRONIC EYEWEAR

FIELD OF THE INVENTION

The invention is directed to wearable electronic devices and more particularly to customizable electronic eyewear.

BACKGROUND OF THE INVENTION

Referring now to FIGS. 1A and 1B, conventional, non-electronic eyewear 100 typically includes a frame 101, a left temple 103, and a right temple 105. The left temple 103 and right temple 105 typically attach to the frame via male hinge elements 107 and female hinge elements 109, held together by a screw/pin 111 to facilitate folding of the eyewear when not in use.

Electronic eyewear is currently focused on interactive experiences such as augmented reality ("AR") and/or virtual reality ("VR") without content for the mass population to adopt for day-to-day use. Consequently, these technologies are typically large and bulky, unstylish, implemented using expensive and complicated photonics systems that require tethering to a power source or use battery life at a rate so as to be impractical, and are generally unworkable for daily use outside of a limited number of indoor activities such as electronic gaming. Users of such technologies therefore must choose between extremely brief usage or be tethered to a cord for a majority of the time and must also be willing to wear unattractive eyewear that incorporates bulky photonics systems.

Other conventional tech-enabled eyewear can generally include one or more integrated cameras that capture still images and videos but also have integrated, non-replaceable batteries with limited life and, due to design constraints, are unable to account for the multitude of user preferences for style and fit. Furthermore, such eyewear provides limited functionality beyond capturing still images or videos, is complex and expensive, often bulky and unstylish, and, even the most stylish are available in an extremely limited number of basic styles. Simply put, developers are primarily focusing their research and development efforts on technologies that have a long way to go before they are adopted by the masses, and have not put sufficient emphasis on producing eyewear designs that accommodate the many varieties of user style preferences and affordability ranges, changing user prescriptions or other lens needs, facilitate continuous use of eyewear regardless of battery charge, developing small replaceable battery schemes for product light weighting and extending functional usage, providing hardware-related software schemes for protecting user data ownership and commercialization ability, or addressing privacy concerns associated with generated data.

Accordingly, none of these conventional electronic eyewear solutions is primed to be useful for, or adopted by, the mass population of consumers.

BRIEF SUMMARY OF THE INVENTION

The benefits and advantages of the present invention over existing systems will be readily apparent from the Brief Summary of the Invention and Detailed Description to follow. One skilled in the art will appreciate that the present teachings can be practiced with embodiments other than those summarized or disclosed below.

In one aspect, a customizable electronic eyewear is provided. The customizable electronic eyewear includes a frame having left and right attachment ports. The customizable electronic eyewear also includes a first sensor module having a first frame engagement portion attachable to a left side of the frame at the left attachment port. The customizable electronic eyewear also includes a first temple hingedly attachable to the first sensor module opposite the frame. The customizable electronic eyewear also includes a second sensor module having a second frame engagement portion attachable to a right side of the frame at the right attachment port. The customizable electronic eyewear also includes a second temple hingedly attachable to the second sensor module opposite the frame. The customizable electronic eyewear also includes a battery installable in a cavity defined in at least one of the first temple or the second temple and operable to supply electrical power to at least one of the first sensor module or the second sensor module.

In some embodiments, the frame includes left and right electrical frame connectors positioned proximate to the respective left and right attachment ports. In some embodiments, each of the first and second sensor modules includes electrical frame-mating connectors positioned and configured for connection with a corresponding one of the left and right electrical frame connectors. In some embodiments, each of the first and second temples includes electrical temple connectors positioned proximate to a module-mating hinge element of the temple. In some embodiments, each of the first and second sensor modules includes electrical temple-mating connectors positioned and configured for connection with a corresponding one of the electrical temple connectors of a corresponding one of the first and second temples in a deployed state of the corresponding one of the first and second temples. In some embodiments, the customizable electronic eyewear also includes at least one of an additional battery, a control panel, an electronics package, or combinations thereof installable in a second cavity defined in at least one of the first temple or the second temple. In some embodiments, each of the first and second temples includes a module-mating hinge element.

In some embodiments, each of the first and second sensor modules includes a temple-mating hinge element. In some embodiments, the module-mating hinge element includes a spherical base and a plurality of protrusions. In some embodiments, the temple-mating hinge element includes a plurality of indentations each sized to receive one of the plurality of protrusions. In some embodiments, the module-mating hinge element includes at least three protrusions. In some embodiments, the temple-mating hinge element includes at least three indentations. In some embodiments, insertion of a middle one of the three protrusions into a middle one of the three indentations produces a neutral pitch between the frame and the temples. In some embodiments, insertion of a middle one of the three protrusions into any of the three indentations other than the middle indentation produces a positive or negative pitch between the frame and the temples.

In some embodiments, the customizable electronic eyewear also includes attachment magnets extending around at least one of the left attachment port or the first engagement portion of the first sensor module and extending around at least one of the right attachment port or the second engagement portion of the second sensor module. In some embodiments, the customizable electronic eyewear also includes a twist and lock attachment formed between each of the left and right attachment ports and a corresponding one of the first and second engagement portions. In some embodiments, the customizable electronic eyewear also includes a push on quick connect attachment formed between each of the left and right attachment ports and a corresponding one of the first and second engagement portions. In some embodiments, the customizable electronic eyewear also includes at least two of attachment magnets extending around at least one of the left attachment port or the first engagement portion of the first sensor module and extending around at least one of the right attachment port or the second engagement portion of the second sensor module, a twist and lock attachment formed between each of the left and right attachment ports and a corresponding one of the first and second engagement portions, and a push on quick connect attachment formed between each of the left and right attachment ports and a corresponding one of the first and second engagement portions. In some embodiments, the customizable electronic eyewear also includes a third sensor at least one of attachable to the frame, receivable in the frame, or integrated into the frame. In some embodiments, the customizable electronic eyewear also includes one or more of an indicator light, a control panel, a battery, or an electronic package at least one of attachable to the frame, receivable in the frame, or integrated into the frame.

Additional features and aspects of the invention include the following:

1. A customizable electronic eyewear comprising:
   a frame having left and right attachment ports;
   a first sensor module having a first frame engagement portion attachable to a left side of the frame at the left attachment port;
   a first temple hingedly attachable to the first sensor module opposite the frame;
   a second sensor module having a second frame engagement portion attachable to a right side of the frame at the right attachment port;
   a second temple hingedly attachable to the second sensor module opposite the frame; and
   a battery installable in a cavity defined in at least one of the first temple or the second temple and operable to supply electrical power to at least one of the first sensor module or the second sensor module.

2. The eyewear of claim 1, wherein the frame includes left and right electrical frame connectors positioned proximate to the respective left and right attachment ports.

3. The eyewear of any of claims 1-2, wherein each of the first and second sensor modules includes electrical frame-mating connectors positioned and configured for connection with a corresponding one of the left and right electrical frame connectors.

4. The eyewear of any of claims 1-3, wherein each of the first and second temples includes electrical temple connectors positioned proximate to a module-mating hinge element of the temple.

5. The eyewear of claim 4, wherein each of the first and second sensor modules includes electrical temple-mating connectors positioned and configured for connection with a corresponding one of the electrical temple connectors of a corresponding one of the first and second temples in a deployed state of the corresponding one of the first and second temples.

6. The eyewear of any of claims 1-5, further comprising at least one of an additional battery, a control panel, an electronics package, or combinations thereof installable in a second cavity defined in at least one of the first temple or the second temple.

7. The eyewear of any of claims 1-6, wherein each of the first and second temples includes a module-mating hinge element.

8. The eyewear of claim 7, wherein each of the first and second sensor modules includes a temple-mating hinge element.

9. The eyewear of claim 8, wherein the module-mating hinge element includes a spherical base and a plurality of protrusions.

10. The eyewear of claim 9, wherein the temple-mating hinge element includes a plurality of indentations each sized to receive one of the plurality of protrusions.

11. The eyewear of claim 10, wherein the module-mating hinge element includes at least three protrusions.

12. The eyewear of claim 11, wherein the temple-mating hinge element includes at least three indentations.

13. The eyewear of claim 12, wherein insertion of a middle one of the three protrusions into a middle one of the three indentations produces a neutral pitch between the frame and the temples.

14. The eyewear of claim 13, wherein insertion of a middle one of the three protrusions into any of the three indentations other than the middle indentation produces a positive or negative pitch between the frame and the temples.

15. The eyewear of any of claims 1-14, further comprising attachment magnets extending around at least one of the left attachment port or the first engagement portion of the first sensor module and extending around at least one of the right attachment port or the second engagement portion of the second sensor module.

16. The eyewear of any of claims 1-15, further comprising a twist and lock attachment formed between each of the left and right attachment ports and a corresponding one of the first and second engagement portions.

17. The eyewear of any of claims 1-16, further comprising a push on quick connect attachment formed between each of the left and right attachment ports and a corresponding one of the first and second engagement portions.

18. The eyewear of any of claims 1-17, further comprising at least two of:
   attachment magnets extending around at least one of the left attachment port or the first engagement portion of the first sensor module and extending around at least one of the right attachment port or the second engagement portion of the second sensor module;
   a twist and lock attachment formed between each of the left and right attachment ports and a corresponding one of the first and second engagement portions; and
   a push on quick connect attachment formed between each of the left and right attachment ports and a corresponding one of the first and second engagement portions.

19. The eyewear of any of claims 1-18, further comprising a third sensor at least one of attachable to the frame, receivable in the frame, or integrated into the frame.

20. The eyewear of any of claims 1-19, further comprising one or more of an indicator light, a control panel, a battery, or an electronic package at least one of attachable to the frame, receivable in the frame, or integrated into the frame.

These and other features of the invention will be apparent from the following detailed description and the accompanying figures.

BRIEF DESCRIPTION OF THE FIGURES

FIG. 1A is a disassembled component view of conventional eyewear in accordance with the prior art.

FIG. 1B is a rear view of a frame of the conventional eyewear of FIG. 1A in accordance with the prior art.

FIG. 2A is a perspective view of customizable electronic eyewear in accordance with various embodiments.

FIG. 6 is a detail view of a push on quick connect interface between a sensor module and a frame of customizable electronic eyewear in accordance with various embodiments.

FIG. 8B is a top view of the smart case of FIG. 8A.

FIG. 8E is a first side view of the smart case of FIG. 8A.

FIG. 8F is a second side view of the smart case of FIG. 8A.

DETAILED DESCRIPTION OF THE INVENTION

Figure 2B:
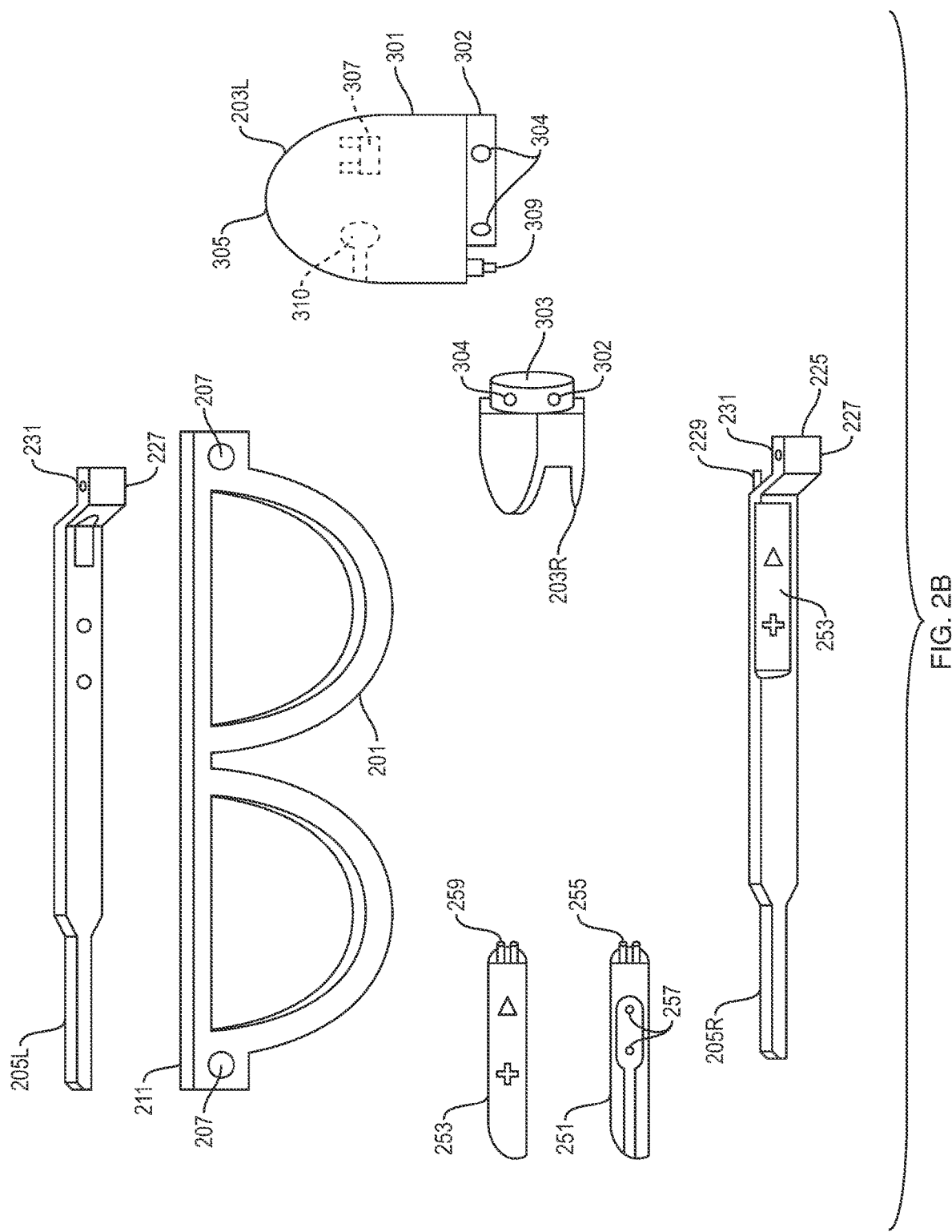
FIG. 2B is a disassembled component view of the customizable electronic eyewear of FIG. 2A.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments, as the skilled artisan would recognize, even if not explicitly stated herein. Any dimensions included in the figures or used herein are merely exemplary and not limiting.

Descriptions of well-known components and processing techniques may be omitted to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it should be noted that while an aspect of the invention is described herein in connection with customizable electronic eyewear, the invention is not limited and certain aspects may be used in other applications, e.g., data authentication and licensing, other wearable devices and cases for wearable devices.

As used herein, the term left refers to a portion of the device that is properly positioned on a left side of a user when the device is being worn and in use. Similarly, the term right refers to a portion of the device that is properly positioned on a right side of a user when the device is being worn and in use.

Customizable Electronic Eyewear

Provided herein are customizable electronic eyewear devices (hereinafter "eyewear") and methods for use thereof. The customizable electronic eyewear provided herein advantageously includes interchangeable assemblable parts including frames, sensor modules attachable to each of a left and right side of the frames, and left and right temples hingedly attachable to a corresponding one of the sensor modules. The temples can generally be configured to receive and electrically connect to one or more removable electronic components including, for example, one or more batteries, one or more control panels (e.g., tactile controls such as buttons or touch-controls), one or more electronic packages (e.g., remote control receivers, microcontrollers, WiFi packages, Bluetooth packages, GPS packages, indicator lights), or combinations thereof (e.g., an assembly including a battery and a control panel, a battery and an electronic package, a control panel and an electronic package).

There are numerous advantages to providing such customization. First, because no expensive electronic elements such as sensor modules, batteries, electronic packages, and control panels are permanently installed in the frames, temples, or lenses, those frames, temples, and lenses are comparatively inexpensive and easily replaced (as with conventional, non-electronic eyewear) when broken, worn, scratched, when a prescription changes, or in the event a user wishes to change an aesthetic style of the eyewear, without needing to completely replace the eyewear or the electronic components. Instead, users of the customizable electronic eyewear are able to simply replace the frame, temples, and/or lenses while reusing the electronic components. Similarly, should the user wish to obtain different functionality, the sensor modules can be interchangeably assembled to provide any one or combinations of, for example but not limited to, video sensors, photographic sensors, infrared sensors, audio sensors, audio speakers, spectrographic sensors, etc. and can install corresponding control panels and electronics packages as needed or appropriate.

Still further, by providing interchangeable batteries, the user can extend functional battery life by simply replacing the installed battery or batteries with one or more spares during use. For example, where a battery is provided in each temple, one or both (depending on the electrical configuration of the eyewear) of the sensors can be in continued use while one of the two batteries is removed for recharging and/or replacement. In addition, because the the lenses and frames are usable even when the batteries are uninstalled or fully discharged, users reliant on prescription eyewear do not suffer from a loss of visual correction. In addition, this feature permits continued use of the electronic eyewear in areas where the use or presence of cameras or other electronic sensors is restricted so long as the user removes all batteries prior to entry.

Referring now to FIGS. 2A and 2B, customizable electronic eyewear 200 in accordance with various embodiments, can include a frame 201, left and right sensor modules 203L, 203R, and left and right temples 205L, 205R.

The frame 201 can generally be sized and shaped to facilitate positioning on the bridge of a user's nose and in front of the user's eyes. The frame 201 can be constructed of plastic or metal, although it will be apparent in view of this disclosure that any suitable material can be used in accordance with various embodiments, including, for example, wood, carbon fiber, rubber, plastics, polymers, metals, alloys, any other suitable material, or combinations thereof. The frame 201 can include opposing attachment ports 207 formed in left and right portions of the frame 201. As best shown in FIG. 2A, the attachment ports 207, in some embodiments, can each include one or more magnets 209 for retaining the corresponding left and right sensor modules 203L, 203R on the frame. Furthermore, magnets 209 can also be positioned at the attachment ports 207 to retain sensor accessories (not shown) such as, for example, one or more lenses, filters, or covers. The frame 201 can also include one or more electrical frame connectors 211 at each of the attachment ports 207 for electrical communication between the sensor modules 203L, 203R and the frame 201. The electrical frame connectors 211 can generally include any suitable electrical connector including, for example, male or female fixed pins, male or female pogo pins, suitably sized USB connectors (e.g., USB-B mini, USB-B micro, USB-C, lighting), contact pads, any other suitable electrical connector, or combinations thereof.

Figure 7:
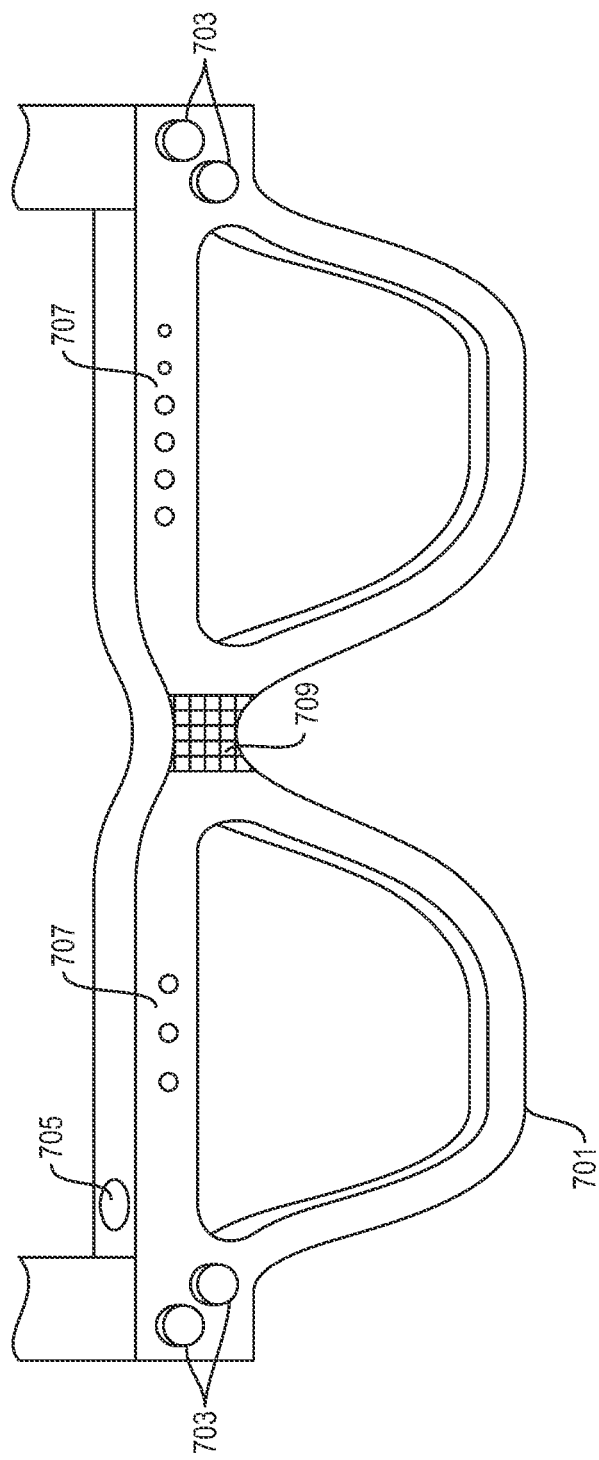
FIG. 7 is a front view of electronic eyewear having a plurality of sensors in accordance with various embodiments.

In some embodiments, including the embodiment depicted in FIG. 2A, the frame 201 includes only an electrical relay to provide electronic connection and communication between the left temple 205L and left sensor module 203L and the right sensor module 203R and right temple 205R. In some embodiments the frame 201 may include additional electronic components (e.g., as shown in FIG. 7 and described in greater detail below).

Figure 3:
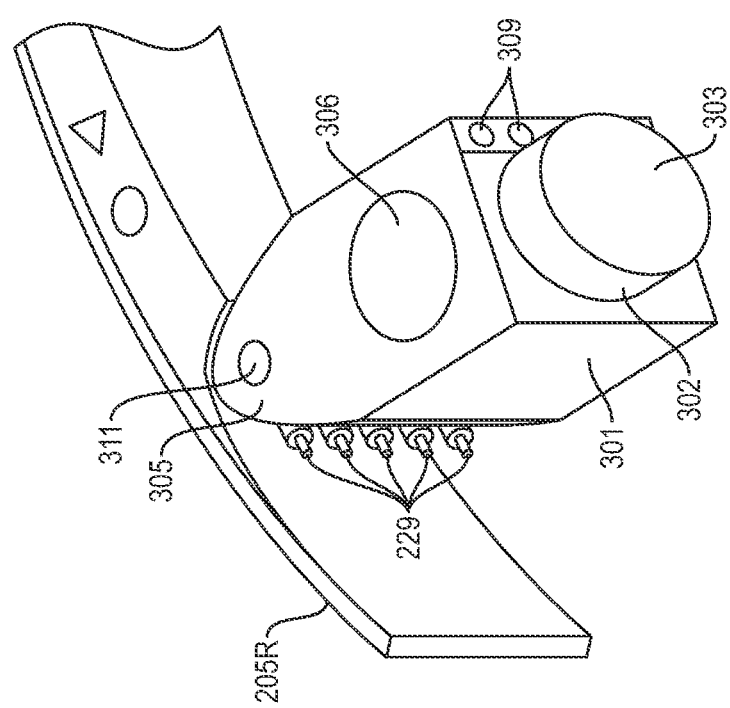
FIG. 3 is a detail view of a sensor module of the customizable electronic eyewear of FIG. 2A.

Referring now to FIGS. 2A, 2B and 3, the sensor modules 203L, 203R can generally be interchangeably assembled to the frame 201 and can include a sensor housing 301 retaining a sensor 303 therein, a module hinge portion 305 formed in the housing 301, electrical temple-mating connectors 307, and electrical frame-mating connectors 309. In some embodiments, the sensor modules 203L, 203R can also include lens storage (also a "lens cradle") 306 for storing one or more lenses, covers, or filters for placement over the sensor 303 in use. The sensor 303 can be any sensor suitable to provide any one or combinations of, for example but not limited to, video sensors, photographic sensors, infrared sensors, audio sensors, audio speakers, spectrographic sensors, RFID readers or transmitters, RF antennas or transceivers, etc. In addition, in some embodiments, instead of or in addition to a sensor 303, the sensor module 203L, 203R can include other electronics packages as needed or appropriate.

As shown in FIG. 2A, in some embodiments the sensor 303 or a lens or other related component thereof can protrude from the sensor housing 301 toward the frame 201, the protruding portion (hereinafter the "frame engagement portion 302") can be sized and shaped so as to be inserted into and/or engaged with a respective one of the attachment ports 207. It will also be apparent in view of this disclosure that, in accordance with some embodiments, the sensor 303 may not protrude from the sensor housing 301 and it may instead be the sensor housing 301 itself (or a combination of both the sensor housing 301 and the sensor 303) that forms or includes the engagement portion 302. As shown in FIGS. 2B and 3, in some embodiments the frame-mating connectors 309 can be positioned adjacent to the engagement portion 302 for connection to the electrical frame connectors 211 of the frame 201.

In some embodiments, the engagement portion 302 may include one or more magnets to maintain engagement with the frame 201. In some embodiments, as shown in FIG. 2B, the engagement portion 302 can also include one or more engagement features 304 (e.g., pogo pins as shown) for providing secure engagement with the frame 201. In some embodiments, the frame 201 may also include corresponding engagement features (see e.g., FIGS. 4B, 4C, and 6).

As shown in FIGS. 2B and 3, in some embodiments, the hinge portion 305 of each sensor module 203L, 203R can be configured for a pinned connection to a corresponding one of the temples 205L, 205R. In particular, the module hinge portion 305 can include a temple-mating hinge element 310 including a pin hole 311 configured to receive a hinge pin therein and may also include one or more of the electrical temple-mating connectors 307. For example, as shown in FIG. 3, the hinge portion 305 can include a through-pin hole 311 for assembly to a corresponding module-mating element 227 of a hinge portion 225 of a temple 205L, 205R. However, it will be apparent that, in accordance with some embodiments, the pin hole 311 can instead include upper and lower pogo pin holes for receiving upper and lower pogo pins extending from the corresponding temple 205L, 205R.

As best shown in FIG. 3, in some embodiments, one or more of the temple-mating connectors 307 can be positioned proximate the pin hole 311 to facilitate connection to one or more electrical temple connectors 229. Each of the temple-mating connectors 307, and frame-mating connectors 309 can generally include any suitable electrical connector including, for example, male or female fixed pins, male or female pogo pins, suitably sized USB connectors (e.g., USB-B mini, USB-B micro, USB-C, lighting), contact pads, any other suitable electrical connector, or combinations thereof.

The temples 205L, 205R can generally be sized and shaped to be positioned over a user's ear and may include one or more cavities (see e.g., FIGS. 4B and 5) for receiving one or more electronic components such as, for example, batteries 251 and control panels 253. In some embodiments the temples 205L, 205R can each include a temple hinge portion 225 having a module-mating hinge element 227 therein. As shown in FIGS. 2A and 3, in some embodiments, the hinge portion 225 of each temple 205L, 205R can be configured for a pinned connection to a corresponding one of the sensor modules 203L, 203R. In particular, the module-mating hinge element 227 can include a pin hole 231 configured to receive a hinge pin therein and may also include one or more of the temple connectors 229. For example, as shown in FIGS. 2A and 2B, the module-mating hinge element 227 can include a through-pin hole 231 for assembly to the corresponding temple-mating hinge element 310 of the sensor hinge portion 305 of the sensor module 203L, 203R. However, it will be apparent that, in accordance with some embodiments, the module-mating hinge portion 227 can instead include upper and lower pogo pins for engagement with upper and lower pin holes of the corresponding sensor module 203L, 203R.

Each of the temple connectors 229 can generally include any suitable electrical connector including, for example, male or female fixed pins, male or female pogo pins, suitably sized USB connectors (e.g., USB-B mini, USB-B micro, USB-C, lighting), contact pads, any other suitable electrical connector, or combinations thereof.

Batteries 251 can generally be sized and shaped to be removably inserted into a cavity of the temples 205L, 205R and can include battery connectors 255 for electrical connection with one or more corresponding connectors (not shown) of the temple 205L, 205R when inserted into the cavity. Electrical power can then be communicated from the battery throughout the various components of the eyewear 200 via the temple connectors 229, the temple-mating connectors 307, the frame-mating connectors 309, and the frame connectors 211. In some embodiments, the batteries 251 can be configured to include one or more indicator lights 257 to indicate, for example, remaining charge/battery life, a current configuration of the glasses, a use status of the eyewear and/or sensors, or any other eyewear-related information.

Control panels 253 can be configured in any desired manner and can include panel connectors 259 for electrical connection with one or more corresponding connectors (not shown) of the temple 205L, 205R when inserted into the cavity. Control signals can then be communicated from the control panel 253 throughout the various components of the eyewear 200 via the temple connectors 229, the temple-mating connectors 307, the frame-mating connectors 309, and the frame connectors. The control panels 253 can be configured in any suitable arrangement, including, for example, as a playback control panel 253a that can be provided with controls (e.g., tactile controls such as buttons or touch-controls) having functionalities such as play, pause, record, stop, fast forward, rewind, etc. In some embodiments a volume control panel 253b can be provided to facilitate audio volume adjustment. Although shown herein as including physical, wired connectors, in some embodiments, the Control Panels 253 can be configured for wireless communication with one or more other components of the eyewear 200. For example, in some embodiments, the control panels 253 can include one or more controls for operating the sensor modules 203R, 203L, the controls paired to one or more RFID chips, which are, in turn, readable by a corresponding RFID reader in the sensor modules 203R, 203L.

It will be apparent in view of this disclosure that, in accordance with some embodiments, any type and configuration of controls can be used in connection with any sensor as desired and/or functionally relevant.

More generally, the temples 205L, 205R can generally be configured to receive and electrically connect to one or more removable electronic components including, for example, one or more batteries 251, one or more control panels 253 (e.g., tactile controls such as buttons or touch-controls), one or more electronic packages (e.g., remote control receivers, microcontrollers, WiFi packages, Bluetooth packages, GPS packages, indicator lights), or combinations thereof (e.g., an assembly including a battery and a control panel, a battery and an electronic package, a control panel and an electronic package).

Temples 205L, 205R can also include one or more charging elements 233 to provide recharging of the one or more batteries 251. The charging elements 233 can include any suitable element for transferring power from mains to a battery 251 including, for example, male or female fixed pins, male or female pogo pins, suitably sized USB connectors (e.g., USB-B mini, USB-B micro, USB-C, lighting), contact pads, inductive charging receivers, any other suitable electrical charging circuitry, or combinations thereof. However, it will be apparent in view of this disclosure that, in some embodiments, it may be preferable for the eyewear 200 to not include any charging elements 233. In particular, because the batteries 251 are removable, the charging could be accomplished externally to the eyewear 200, in turn reducing the complexity, weight, size, and cost of the temples 205L, 205R.

Figure 4A:
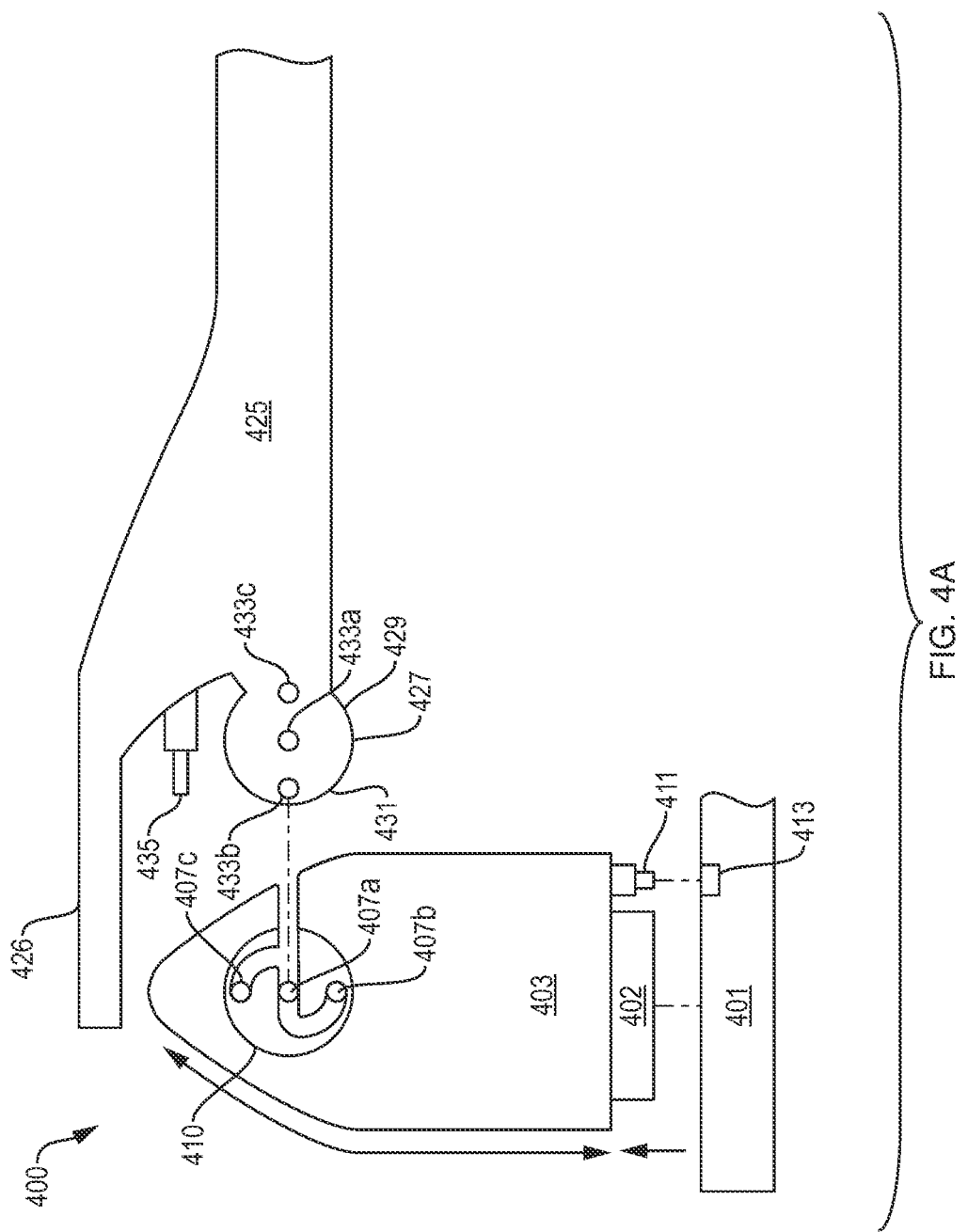
FIG. 4A is a partial disassembled component view of a right side of customizable electronic eyewear having a rocker pinion hinge between the temple and sensor module in accordance with various embodiments.
Figure 4B:
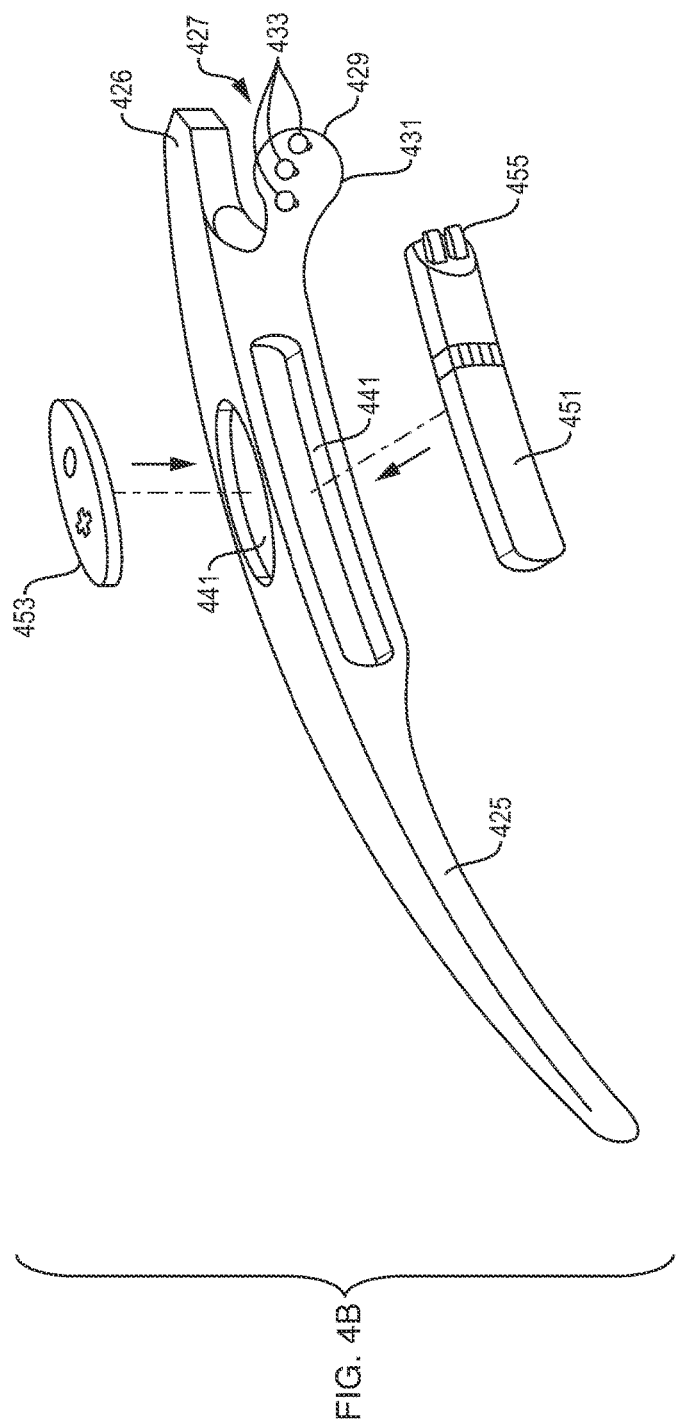
FIG. 4B is a disassembled component view of a left side temple of the customizable electronic eyewear of FIG. 4A including illustration of removable battery and control panel elements.
Figure 4C:
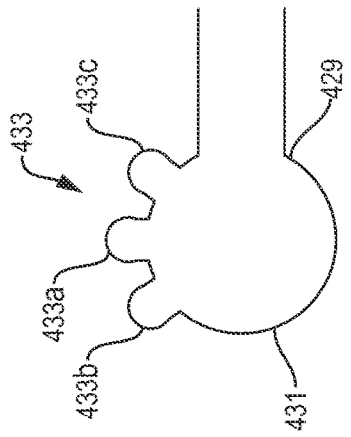
FIG. 4C is a side view of a module-mating hinge element of the temple of FIG. 4A.

Referring now to FIGS. 4A, 4B, and 4C, in some embodiments customizable electronic eyewear 400 can include a rocker pinion hinge to facilitate both hinging action and pitch adjustment. In particular, a temple 425 can include a hinge portion 427 having a module-mating hinge element 429 of having a generally spherical base 431 and three protrusions 433 extending therefrom. A temple-mating hinge element 410 of hinge portion 405 of sensor module 403 can generally include three corresponding indentations 407 for receiving the protrusions 433. For a neutral pitch between the frame 401 and sensor module 403 relative to the temple 425, the user can engage the central protrusion 433a such that it positively mates with or "clicks" into the middle indentation 407a. As the temple 425 is rotated open by the user for use, the other two protrusions 433b, 433c click into the other indentations 407b, 407c, temple connectors 435 make connection to temple-mating connectors (not shown) to complete the circuit, and an outer portion 426 of the temple 425 wraps around to the frame 401.

If an inclined or declined pitch between the frame 401 and sensor module 403 relative to the temple 425 is desired, the user can adjust the pitch by pivoting the temple 425 such that the middle protrusion 433a clicks into one of the other indentations 407b, 407c.

Although shown and described herein as having a pin hinge or a rocker pinion hinge, it will be apparent in view of this disclosure that any suitable hinge configuration can be used in accordance with various embodiments.

As shown in FIG. 4B, the temple 425 can generally be sized and shaped to be positioned over a user's ear and may include one or more cavities 441 for receiving one or more electronic components such as, for example, batteries 451 and control panels 453.

Batteries 451 can generally be sized and shaped to be removably inserted into one of the cavities 441 of the temple 425 and can include battery connectors 455 for electrical connection with one or more corresponding connectors (not shown) of the temple 425 when inserted into the cavity 441. Electrical power can then be communicated from the battery throughout the various components of the eyewear 400 via the temple connectors 435, the temple-mating connectors (not shown), frame-mating connectors 411, and the frame connectors 413. In some embodiments, the batteries 451 can be configured to include one or more charge indicator lights (not shown).

Control panels 453 can be configured in any desired manner and can include panel connectors (not shown) for electrical connection with one or more corresponding connectors (not shown) of the temple 425 when inserted into the cavity. Control signals can then be communicated from the battery throughout the various components of the eyewear 400 via the temple connectors 435, the temple-mating connectors (not shown), frame-mating connectors 411, and the frame connectors 413. Control panels can be configured in any suitable arrangement, including, for example, as a playback control panel 453 that can be provided with controls such as play, pause, record, stop, fast forward, rewind, etc. However, it will be apparent in view of this disclosure that, in accordance with some embodiments, any type and configuration of controls can be used in connection with any sensor as desired and/or functionally relevant.

Figure 5A:
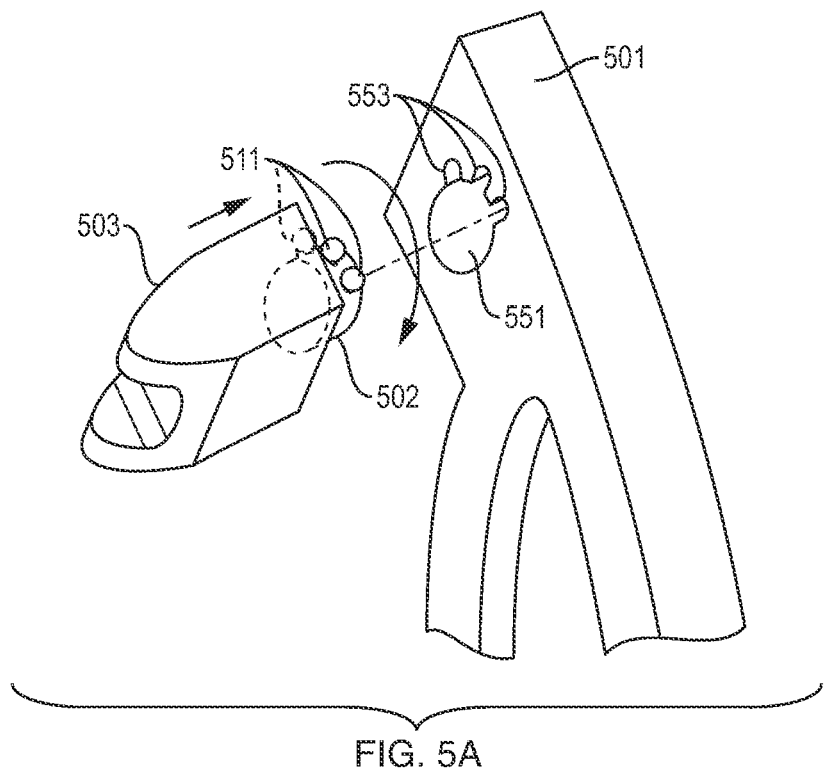
FIG. 5A is a disassembled component view of a left side of a customizable electronic eyewear having a twist and lock interface between the sensor module and frame in accordance with various embodiments.
Figure 5B:
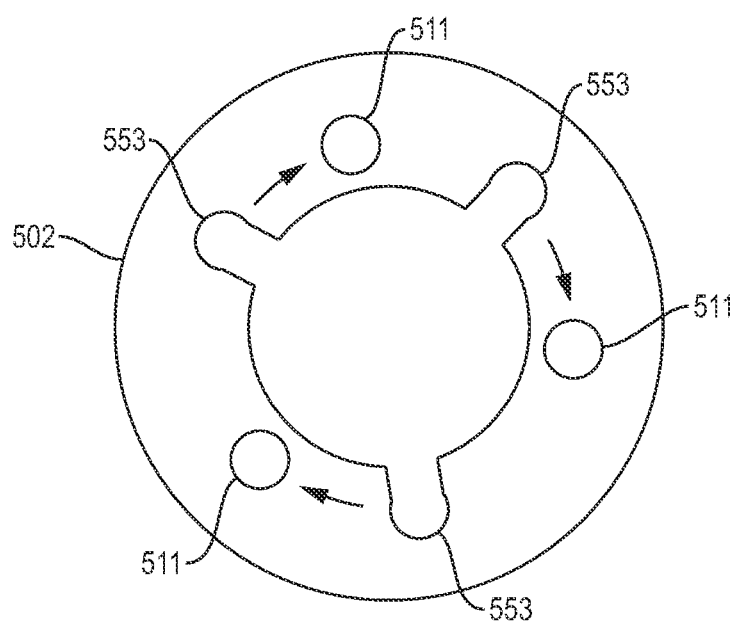
FIG. 5B is a detail view of the twist and lock interface of FIG. 5A.

Referring now to FIGS. 5A and 5B, in some embodiments a customizable electronic eyewear can include a frame 501 including one or more attachment portals 551 configured for twist and lock attachment to a frame engagement portion 502 of the sensor module 503. The frame engagement portion 502 can include one or more engagement members 511 extending radially outward therefrom for insertion into one or more keyholes 553 formed in the attachment portal 551 and sized to receive the engagement members. The sensor module 503 can then be rotated to misalign the engagement members 511 with the keyholes 553 to retain the sensor module in attachment with the frame 501. In some embodiments, one or more detents (not shown) may be provided within the attachment portal, circumferentially offset from the keyholes 553, into which the engagement members 511 can be received to provide more secure attachment between the sensor module 503 and the frame 501.

Referring now to FIG. 6, in some embodiments a customizable electronic eyewear can include a frame 601 including one or more attachment portals 651 configured for push on quick connect attachment to a frame engagement portion 602 of the sensor module 603. The frame engagement portion 602 can include a groove 611 extending circumferentially around the engagement portion 602 for receiving an expandable circular spring 653 positioned in the attachment portal 651 and configured expand to receive the engagement portion 602 into the attachment portal 651 and then contract into the groove 611 so as to retain the sensor module 603 within the portal 651 to maintain engagement between the frame 401 and the sensor module 603.

Although shown and described herein as having magnetic, push on quick connect, twist and lock, or detent/indentation connection between the sensor module and the frame, it will be apparent in view of this disclosure that any suitable method for attachment can be used in accordance with various embodiments.

In some embodiments, a plurality of sensors and other electronic devices can be incorporated into the customizable electronic eyewear of the present invention. For example, referring now to FIG. 7, in some embodiments each side of a frame 701 can include a plurality of attachment ports 703 for receiving multiple sensors 703. In some embodiments, multiple sensors 703 may be packaged in separate sensor modules (not shown), in some embodiments each sensor module (not shown) can include a plurality of sensors 703, or combinations thereof. The frames 701, can also include one or more buttons 705 (e.g., for selecting various modes and/or functionalities of the various sensors 703). The frames 701 can also include one or more indicator lights 707 (e.g., LEDs as shown) for indicating, for example, selected mode, selected sensor, battery life, and/or any other desired indication. The frames 701 can further include bridge sensors 709 positioned proximate the bridge of the frame 701. In some embodiments the bridge sensors 709 can be integrated within the frame 701 or can be removably attachable. This configuration can permit more robust sensor data for more intensive applications. For example, one sensor configuration for the eyewear depicted in FIG. 7 can include one visible spectrum video sensor and one infrared video sensor positioned at each side of the frame 701 and both an audio microphone and a spectrometer attached as bridge sensors. Such a configuration could be useful for a hazmat or dangerous rescue application where the user is likely to need visual information and an ability to communicate with others but also may require infrared detection for advanced warning with regard to extreme heat in a potential fire environment or an ability to identify the body heat of living beings in a low-visibility rescue environment, as well as spectrometer readings to provide advanced warning or early detection of dangerous chemicals. More generally, it will be apparent that any combination of any number of sensors may be used in accordance with various embodiments.

Smart Case

Figure 8A:
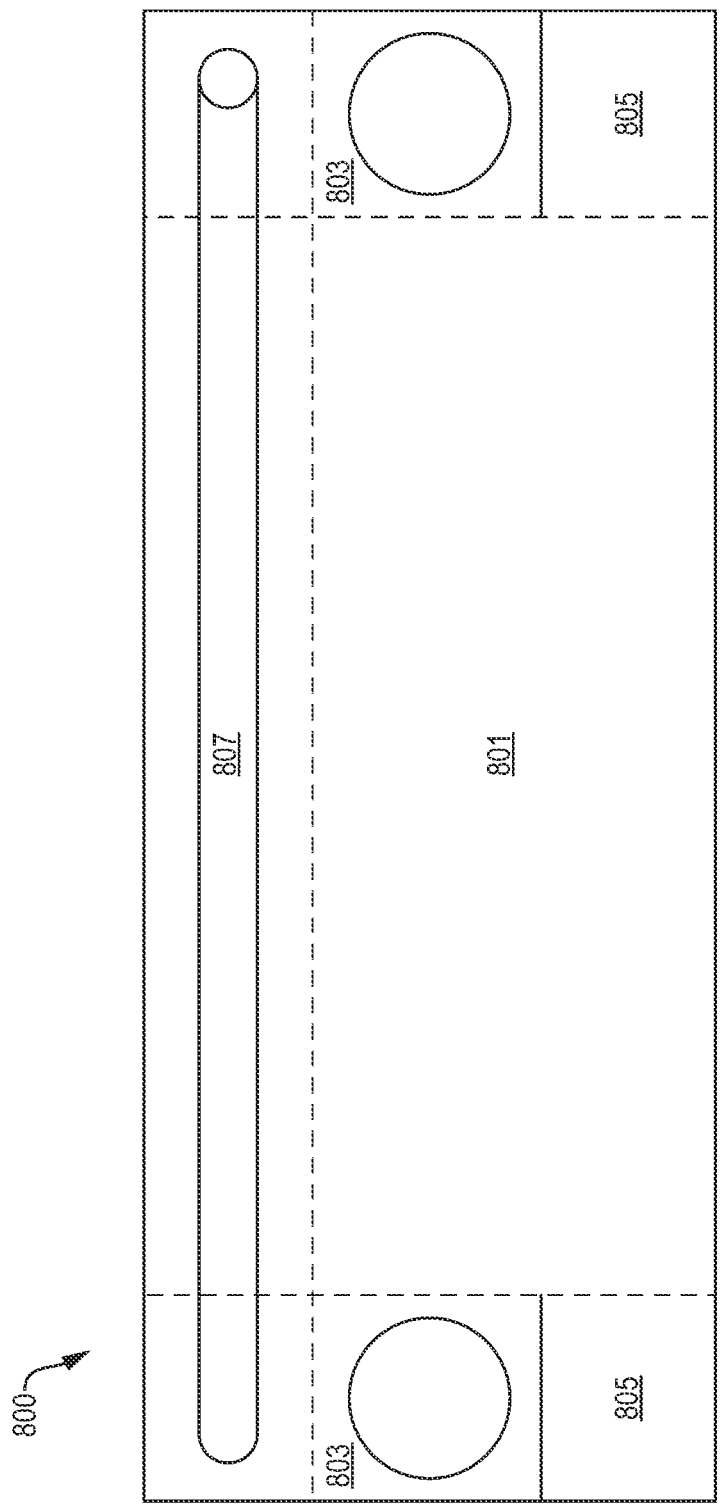
FIG. 8A is an interior cross-sectional top view of a smart case for customizable electronic eyewear in accordance with various embodiments.

Referring now generally to FIGS. 8A-8F, in some embodiments a multifunctional smart case 800 is provided in which to store customizable electronic eyewear and other electronic devices. FIG. 8A illustrates an interior cross-sectional top view of the smart case 800. Although the smart case 800 is shown as substantially rectangular in shape and having approximately 14 separate compartments and/or modules herein, one of skill in the art will appreciate in view of this disclosure that the smart case can be formed into any suitable shape and layout having any desired number of compartments and/or modules in accordance with various embodiments. In some embodiments, the smart case 800 can be formed similar to an eyeglass case with a spring-hinged clamshell design. As show in FIG. 8A, smart case 800 can include storage space 801 for the eyewear (e.g., eyewear 100 or 400 described herein) as well as any modules therefore, such as additional versions of temples 205L, 205R, 425, sensor modules 203L, 203R, 403, 503, 603, 703, batteries 251, 451, control panels 253, 453, memory devices or other electronic modules, and/or additional frames 201, 401, 501, 601, 701.

Smart case 800 can also include smart watch storage 803 for containing one or more smart watches or smart watch components. Smart case 800 can also include earbud storage 805 for left and right earbuds, which, in some embodiments can be used as audio devices in connection with smart case 800 and its peripherals. In some embodiments, smart case 800 can include one or more removable batteries and components that enable technological capabilities. For example, in some embodiments, smart case 800 includes a rollout screen 807 that can be used as a projector screen. In some embodiments, rollout screen 807 is a flexible or rollable display using technology such as Organic LCD, OLED, or electrophoretic ink.

FIG. 8B shows a top view of the smart case 800 equipped with a smartphone dock 825, shown in FIG. 8B as having a docked smartphone 826 retained therein. In some embodiments, the docked smartphone 826 can be held in the dock 825 by a plurality of magnets (not shown) positioned in the smartphone dock 825 and/or a plurality of corresponding magnets 827 positioned on the docked smartphone. In some embodiments, the smart case 800 can include one or more of a CPU, one or more network interfaces (e.g., Wi-Fi, 5G network, cellular), and a battery pack, each of which can be used by the docked smartphone 826 when it is docked to or in communication (e.g., wireless, wired) with smart case 800. In some embodiments, one or more native features of the smartphone 826 such as photographic, videographic, audio, and biometric sensors (e.g., cameras, video cameras, microphones, retinal scanners, fingerprint readers, and combinations thereof) can be used to act as a security closure for compartments of smart case 800. For example, smartphone 826 can be mounted such that it covers the opening to storage space 801, and cannot be removed from smart case 800 unless the right biometric information is received from an authorized user of the system.

Figure 8C:
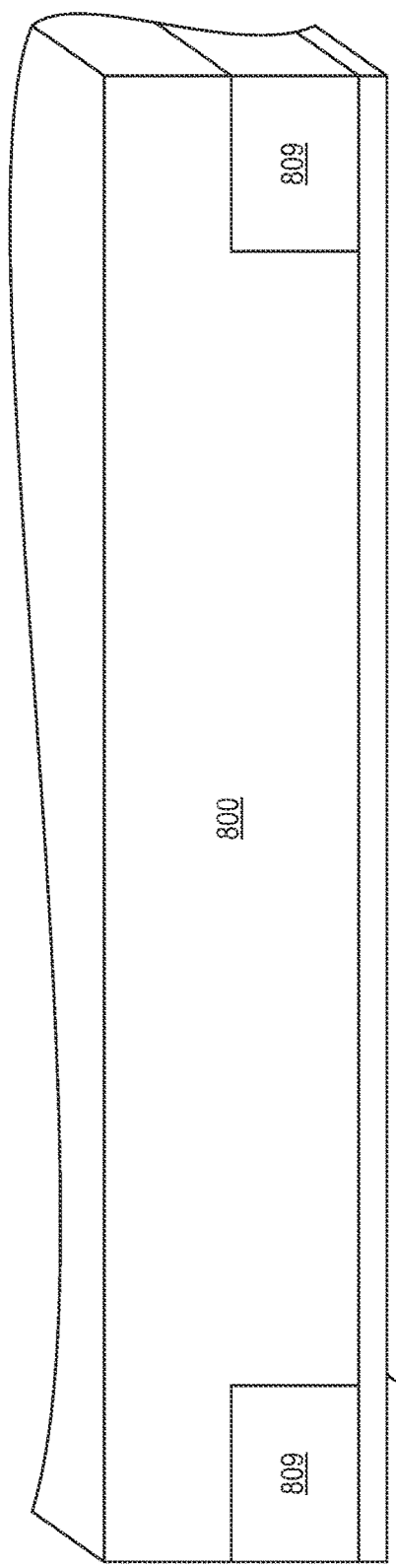
FIG. 8C is a front view of the smart case of FIG. 8A.
Figure 8D:
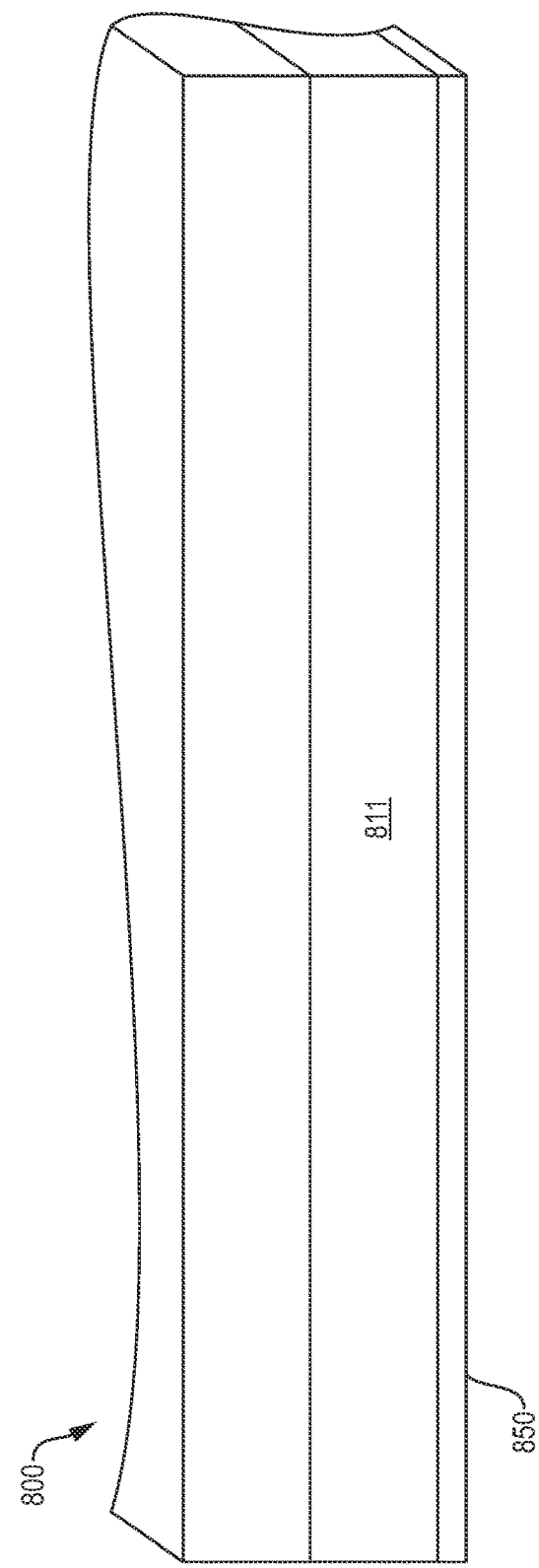
FIG. 8D is a rear view of the smart case of FIG. 8A.

FIG. 8C shows a front view of smart case 800, and FIG. 8D shows a rear view of smart case 800. As shown in FIG. 8C, smart case 800 can include one or more speaker assemblies 809 for providing audio functionality. Further, as shown in FIGS. 8C-8F, smart case 800 can include a detachable battery 850 for providing electrical power to various features of the smart case 800 (e.g., CPU, speakers 809, roll up screen 807) or the devices (e.g., eyewear, earbuds, smart watches) stored therein. FIG. 8D also illustrates an exemplary component section 811 of smart case 800 for containing features of the smart case 800 such as the CPU, communication interface, and other components that are not independent devices stored in the case (e.g., eyewear, earbuds, smart watches). In some embodiments, the component section 811 may be removable for weight savings in circumstances where such additional functionalities are not needed. Additionally, in some embodiments, the component section 811 can be replaceable with an additional storage module (not shown) to provide increased storage capacity of the smart case 800. Still further, by the component section 811 being removable, the processing core, memory, communication interface, and other core logic can be swapped out or upgraded by the user.

FIGS. 8E and 8F are opposing first and second side views of smart case 800. As shown, the smart case 800 includes a number of features and storage options. In addition to the speaker assemblies 809, earbud storage 805, smart watch component storage 803, roll up screen 807, and component section 811, the smart case 800 can also include a retractable coiled power cable 813 for charging removable battery 850 and/or batteries of stored devices (e.g., eyewear, earbuds, smart watches). Advantageously, such power cables are durable, easy and inexpensive to fix if broken, and they obviate the need for a plurality of different cables and chargers to power and charge the various devices and components. In some embodiments, in order to communicate with other systems, smart case 800 also includes a data connection (e.g., a USB-C flush push out connector 815 as shown). In some embodiments the data connection can be angled slightly downward to reduce corrosion potential. In some embodiments, the smart case 800 can instead include a retractable USB-C cable.

It will be apparent in view of this disclosure that, in some embodiments, due to technology cost, limitations, and changes, smart case 800 can have fewer, additional, or new modules and components. For example, smart case 800 and the components can be customizable and upgradable with new technology. Similarly, the eyewear described herein has key design characteristics that permit customization for both fashion and function, using current technology in order to capture life on an ongoing basis and permitting the user to upgrade, for example, battery and sensor technologies as they improve.

It will be further apparent in view of this disclosure that the customizable techniques described herein can be applied to non-eyewear devices or eyewear that is designed differently but with the concept of capturing life in a multidimensional manner for use of recreating that specific location and time. These other devices may include but are not limited to headwear, body cameras, smartphones, external, fixed sensors, sensors installed in motor vehicles, and other devices configured to capture one's environment and life data. Other embodiments may collect various types of data via a plurality of devices, including the the eyewear. For example, in some embodiments, a system may limit the data collected by the eye wear to one or a limited subset of audio data, visual data, spectrographic data, optical wavelengths, infrared wavelengths, etc. and employ other devices worn by the user to capture one or more other types of data. Alternatively, in some embodiments two or more such devices (including the eyewear) could be configured to collect similar types of data to provide spatially differentiated data points (e.g., from the eyewear, headphones, and a body camera).

Data Authentication and Protection

Broader adoption of electronic eyewear is likely to require methodologies that build public trust in the security, privacy, traceability, and commercialization of what is often likely to be highly personal, commercially exploitable information. In this regard, methods for tracing, authenticating, and securing ownership of mass amounts of personal user data collected by the above-described customizable electronic eyewear, as well as from other electronic sensors, are provided herein.

Described herein are methods for protecting the rights of data by using physical hardware flaws specific to individual data capturing systems to map user data and assets back to the hardware and user in order to prove rights and claim value. These hardware fingerprints are specific to individual data collecting devices enabling version control from origination and detection of digital assets with proper chain of ownership and permission for use. Using hardware defects and algorithms to adjust these defects in real time from the detection of data onward provides an additional level of encryption that requires users looking to infringe to understand types of hardware flaws being addressed, actual hardware flaws per system, and the methods used to document and overcome these flaws. To minimize delay of real time data transfer, these attributes are documented and hard coded during the device manufacturing process. Once the data is modified from its original form and transferred to a less lightweight device such as a smartphone or network with virtual computing power additional image enhancements can be made to further embed invisible watermarks including metadata and chain of ownership into the image. The importance of chain of data ownership becomes more acute as multidimensional data is captured, integrated into the user's life, and used for profit. However, to accomplish this one must ensure control of the asset from inception with hardware and software and take into consideration the overall system architecture and utility of multiple pieces in concert to provide the users an overall environment in which it makes sense to adopt and wear tech eyewear to capture mass amounts of data.

Capturing the information that our eyes, ears, nose and other biological sensors detect through hardware sensors requires manipulation of the data to overcome hardware and software limitations that do not capture the full extent of virgin data. For example, substantially all CMOS detectors have dead pixels. The dead pixels are mapped and overlap with defects on optical filters and lens assemblies. Infrared detectors and other sensors require similar adjustments to overcome hardware flaws or calibration.

At the same time, the current state-of-the-art data capturing devices require the user to take multiple steps in capturing and streaming events. This data is typically downloaded to a smartphone and shared through text or social media. Once the data is in the public domain one can utilize portions of the digital asset for profit without the user knowing. If the proper hardware is adopted to enable instantaneous mass data capture, then finding a novel way to trace ownership and retain digital asset value per user becomes a more acute problem.

The current state-of-the-art image and video capturing devices utilize 2D assets. As the industry moves to depth sensors and multidimensional headsets the data for interacting in an immersive multidimensional environment becomes more valuable. This becomes even more acute when the user would like to attend live streams and one is utilizing data captured by multiple users and devices to provide that environment.

In some embodiments, this can be accomplished by mapping dead pixels in a camera module and using image enhancement to replace those pixels with the average color, brightness, and other attributes of the pixels that surround it. The dead pixels would then be a hardware key associated with specific hardware owned by a particular user and the image enhancement would be employed to verify a true image. The software algorithms can use other methods to address the dead pixel such as using the mean properties values of just the top and bottom pixels that touch the dead pixels. This will remain proprietary to the camera module manufacturer where the dead pixel placement can be used by the user to change original assets or reassign the assets.

The system architecture provides lightweight code approach in real time that is built into systems today but not used for big data ownership applications. Tracking and utilizing flaws on data capturing hardware devices enables a highly protected fingerprint minimizing lag times and enabling traceability of the virgin data prior to manipulation.

Provided herein are methods and system architectures for protecting user captured data and enabling sharing of that data with authentication, confidentiality, access control, and data processing within the device to edge-to-cloud continuum. In some embodiments, such methods and system architectures can protect user data by incorporating unique hardware characteristic mapping into the user data. Such unique hardware characteristic maps can generally be any asset-hardware traceable characteristics attributable to the specific hardware itself.

Figure 9:
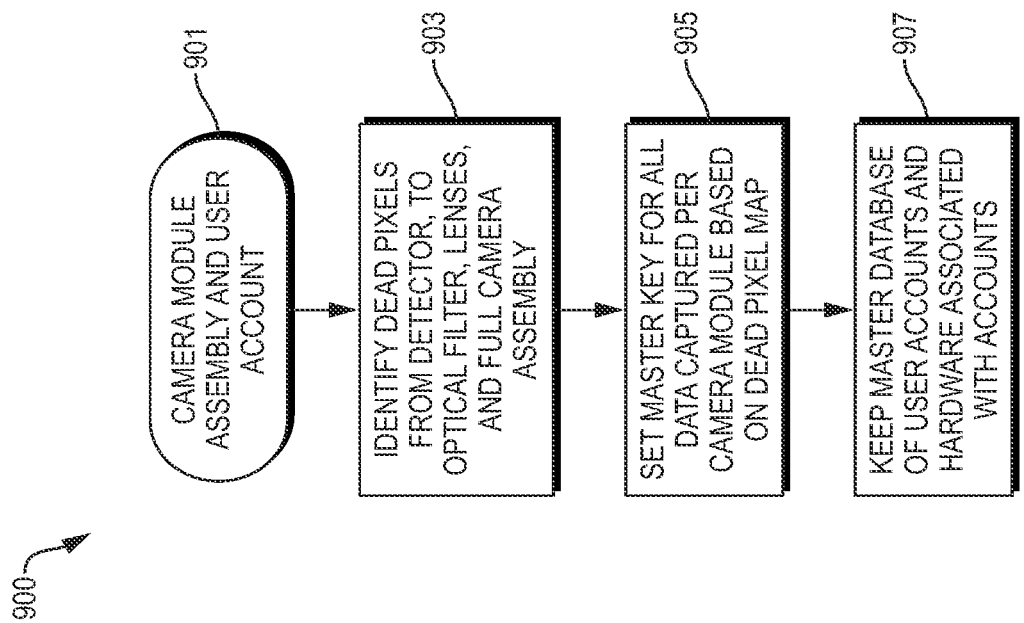
FIG. 9 is a flow chart illustrating a method for generating user data authentication keys in accordance with various embodiments.

Referring now to FIG. 9, in some embodiments, a method 900 for generating user data authentication keys includes providing 901 a sensor module and a user account, identifying and mapping 903 at least one unique characteristic of the sensor module (e.g., dead pixels in a camera module), setting 905 a master key for encoding all data captured by the sensor module based on the map of unique characteristics (e.g., a dead pixel map), and keeping (storing and maintaining) 907 the master key in a master database correlating the master key with both the user account with the camera module.

The step of providing 901 a sensor module can include, for example, providing one or more sensor modules as described above. The step 901 of providing the user account can be generally consistent with known methods for creating an internet user account.

The step of identifying and mapping 903 can preferably be performed during or after manufacture but before delivery to the user. Although described herein in the context of mapping patterns of dead pixels in a camera or other optical and/or infrared sensor, it will be apparent in view of this disclosure that any repeatably measurable unique characteristics can be used in accordance with various embodiments. For example, a digital microphone or other electronic sensor may include unique patterns of fundamental and/or technological noise such as Johnson-Nyquist noise, quantum noise, Zener noise, and Avalanche noise. Temperature, audio, visual and other sensors may require gain adjustments which can also be unique per device and used for traceability.

The step of setting 905 a master key can include associating the map with the specific hardware device in a master database and the step of keeping 907 can include associating the hardware (and thus the key) with a user account of a purchaser or other user known to have acquired ownership of the hardware associated with the key in the master database.

Figure 10:
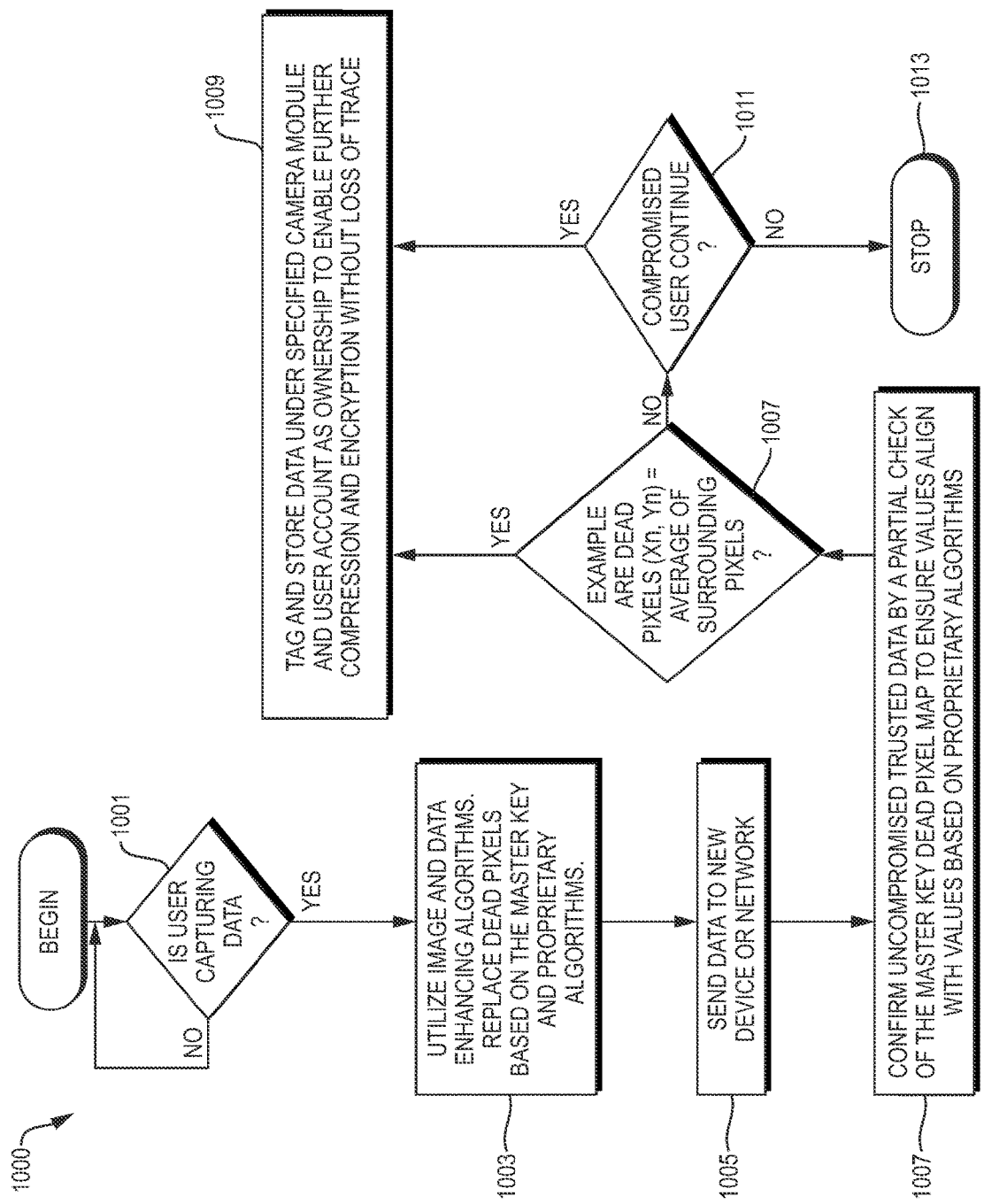
FIG. 10 is a flow chart illustrating a method for authenticating user data in accordance with various embodiments.

Referring now to FIG. 10, in some embodiments, a method 1000 for authenticating user data includes determining 1001 whether a user device is capturing data, replacing 1003, by enhancement (e.g., image enhancement), mapped characteristics (e.g., dead pixels) in the user data as identified by the master key and according to a known methodology, transmitting 1005, the enhanced user data to a computing device (e.g., a smartphone, tablet, network, laptop, or desktop) or network, confirming 1007 that the enhanced user data received at the computing device or network is uncompromised by verifying an associated user's master key match. If the enhanced user data matches the master key then the computing device or network will proceed with tagging and storing 1009 the enhanced user data in the master database as associated with the user account and the specific data source hardware (original asset), which is also associated with that user account as described above in connection with FIG. 9. Once the confirmed original asset and master key metadata are recorded, the data can then be identified for future commercial reference and can also be further compressed, encrypted, and/or transmitted through one or more networks to one or more other devices.

If the enhanced user data does not match the master key then the computing device or network will proceed with prompting 1011 the user to agree to data transmission without the protection afforded by the hardware authentication. Should the user agree, the computing device or network will proceed with tagging and storing 1009. Should the user decline the prompting 1011, the computing device or network will instead proceed with terminating 1013 data collection.

Figure 11:
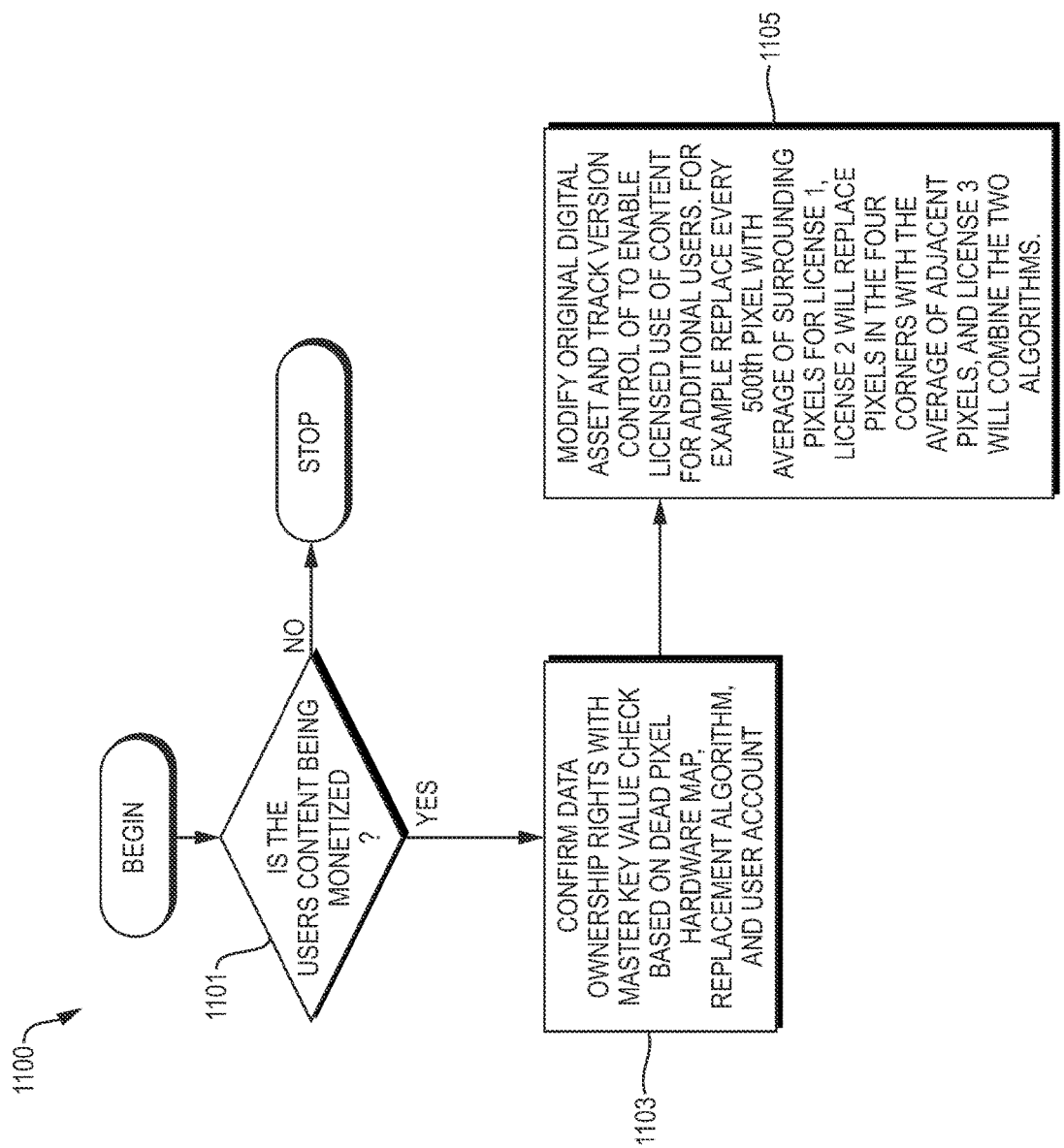
FIG. 11 is a flow chart illustrating a method for validating licensee rights to authenticated user data in accordance with various embodiments.

Referring now to FIG. 11, in some embodiments, a method 1100 for authenticating license rights in user data includes determining 1101 whether user data associated with a user account is being monetized or licensed, confirming 1103 user data ownership, and modifying 1105 characteristics of the confirmed owned user data according to a known methodology corresponding to a licensee account.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications or modifications of the disclosure.

What is claimed is:

1. A customizable electronic eyewear comprising:
   a frame having left and right attachment ports;
   a first sensor module having a first frame engagement portion attachable to a left side of the frame at the left attachment port;
   a first temple hingedly attachable to the first sensor module opposite the frame;
   a second sensor module having a second frame engagement portion attachable to a right side of the frame at the right attachment port;
   a second temple hingedly attachable to the second sensor module opposite the frame; and
   a battery installable in a cavity defined in at least one of the first temple or the second temple and operable to supply electrical power to at least one of the first sensor module or the second sensor module,
   wherein each of the first and second temples includes electrical temple connectors positioned proximate to a module-mating hinge element of the temple, and
   wherein each of the first and second sensor modules includes electrical temple-mating connectors positioned and configured for connection with a corresponding one of the electrical temple connectors of a corresponding one of the first and second temples in a deployed state of the corresponding one of the first and second temples.

2. The eyewear of claim 1, wherein the frame includes left and right electrical frame connectors positioned proximate to the respective left and right attachment ports.

3. The eyewear of claim 2, wherein each of the first and second sensor modules includes electrical frame-mating connectors positioned and configured for connection with a corresponding one of the left and right electrical frame connectors.

4. The eyewear of claim 1, further comprising at least one of an additional battery, a control panel, an electronics package, or combinations thereof installable in a second cavity defined in at least one of the first temple or the second temple.

5. The eyewear of claim 1, wherein each of the first and second temples includes a module-mating hinge element.

6. The eyewear of claim 5, wherein each of the first and second sensor modules includes a temple-mating hinge element.

7. The eyewear of claim 6, wherein the module-mating hinge element includes a spherical base and a plurality of protrusions.

8. The eyewear of claim 7, wherein the temple-mating hinge element includes a plurality of indentations each sized to receive one of the plurality of protrusions.

9. The eyewear of claim 8, wherein the module-mating hinge element includes at least three protrusions.

10. The eyewear of claim 9, wherein the temple-mating hinge element includes at least three indentations.

11. The eyewear of claim 10, wherein insertion of a middle one of the three protrusions into a middle one of the three indentations produces a neutral pitch between the frame and the temples.

12. The eyewear of claim 11, wherein insertion of a middle one of the three protrusions into any of the three indentations other than the middle indentation produces a positive or negative pitch between the frame and the temples.

13. The eyewear of claim 1, further comprising a twist and lock attachment formed between each of the left and right attachment ports and a corresponding one of the first and second engagement portions.

14. The eyewear of claim 1, further comprising a push on quick connect attachment formed between each of the left and right attachment ports and a corresponding one of the first and second engagement portions.

15. The eyewear of claim 1, further comprising a third sensor module at least one of attachable to the frame, receivable in the frame, or integrated into the frame.

16. The eyewear of claim 1, further comprising one or more of an indicator light, a control panel, a battery, or an electronic package at least one of attachable to the frame, receivable in the frame, or integrated into the frame.

17. A customizable electronic eyewear comprising:
a frame having left and right attachment ports;
a first sensor module having a first frame engagement portion attachable to a left side of the frame at the left attachment port;
a first temple hingedly attachable to the first sensor module opposite the frame;
a second sensor module having a second frame engagement portion attachable to a right side of the frame at the right attachment port;
a second temple hingedly attachable to the second sensor module opposite the frame;
a battery installable in a cavity defined in at least one of the first temple or the second temple and operable to supply electrical power to at least one of the first sensor module or the second sensor module; and,
attachment magnets extending around at least one of the left attachment port or the first engagement portion of the first sensor module and extending around at least one of the right attachment port or the second engagement portion of the second sensor module.

18. A customizable electronic eyewear comprising:
a frame having left and right attachment ports;
a first sensor module having a first frame engagement portion attachable to a left side of the frame at the left attachment port;
a first temple hingedly attachable to the first sensor module opposite the frame;
a second sensor module having a second frame engagement portion attachable to a right side of the frame at the right attachment port;
a second temple hingedly attachable to the second sensor module opposite the frame;
a battery installable in a cavity defined in at least one of the first temple or the second temple and operable to supply electrical power to at least one of the first sensor module or the second sensor module; and;
at least two of:
attachment magnets extending around at least one of the left attachment port or the first engagement portion of the first sensor module and extending around at least one of the right attachment port or the second engagement portion of the second sensor module;
a twist and lock attachment formed between each of the left and right attachment ports and a corresponding one of the first and second engagement portions; and
a push on quick connect attachment formed between each of the left and right attachment ports and a corresponding one of the first and second engagement portions.

* * * * *